United States Patent
Dovek et al.

[11] Patent Number: 5,867,889
[45] Date of Patent: Feb. 9, 1999

[54] DOUBLE SELF-ALIGNED INSULATED CONTIGUOUS JUNCTION FOR FLUX-GUIDED-MR OR YOKE-MR HEAD APPLICATIONS

[75] Inventors: Moris Musa Dovek; Robert Edward Fontana, Jr., both of San Jose; Linda Hope Lane, Gilroy; Edward Hin Pong Lee, San Jose, all of Calif.

[73] Assignee: International Business Machines Corporation, Armonk, N.Y.

[21] Appl. No.: 829,869

[22] Filed: Apr. 1, 1997

[51] Int. Cl.$^6$ ................................................. G11B 5/127
[52] U.S. Cl. ................................................. 29/603.13
[58] Field of Search ........................ 29/603.13; 427/123

[56] References Cited

U.S. PATENT DOCUMENTS

| | | | |
|---|---|---|---|
| 4,918,554 | 4/1990 | Bajorek et al. | 360/113 |
| 5,032,945 | 7/1991 | Argyle et al. | 360/126 |
| 5,079,035 | 1/1992 | Krounbi et al. | 427/130 |
| 5,438,470 | 8/1995 | Ravipati et al. | 360/113 |
| 5,458,908 | 10/1995 | Krounbi et al. | 427/123 |
| 5,664,316 | 9/1997 | Chen et al. | 29/603.08 |

FOREIGN PATENT DOCUMENTS

| | | | |
|---|---|---|---|
| 0 438 350 B1 | 1/1991 | European Pat. Off. | G11B 5/39 |
| 6267034 | 9/1994 | Japan | G11B 5/39 |

*Primary Examiner*—David A. Scherbel
*Assistant Examiner*—Benjamin M. Halpern
*Attorney, Agent, or Firm*—Gray Cary Ware Freidenrich

[57] ABSTRACT

A magnetoresistive (MR) head having a double self-aligned contiguous junction includes an MR sensor structure with a biased guide joined thereto. The guide is formed using a first resist mask applied over the MR sensor structure. A guide biasing structure is formed using the first resist mask and a second resist mask applied over the first resist mask and the guide. The first resist mask is configured to form a double self-aligned contiguous junction between the MR sensor structure and the guide and guide bias structure. In this manner, the position of the guide biasing structure is carefully controlled so that it does not overlap the MR sensor structure.

18 Claims, 15 Drawing Sheets

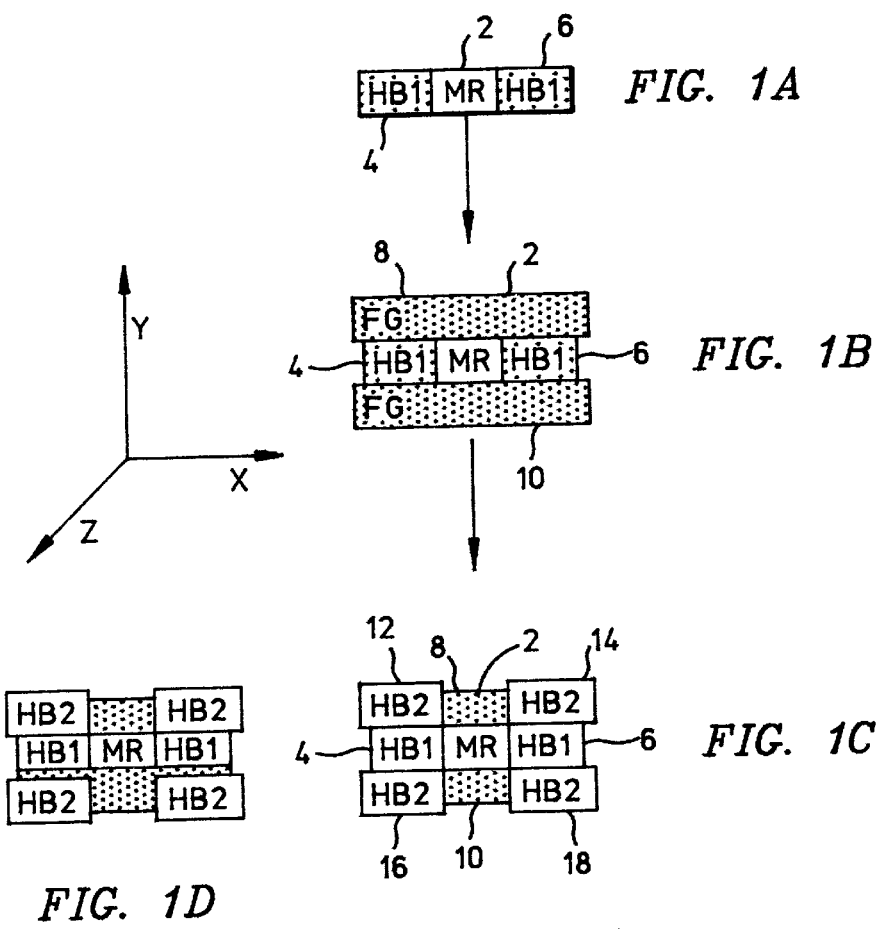
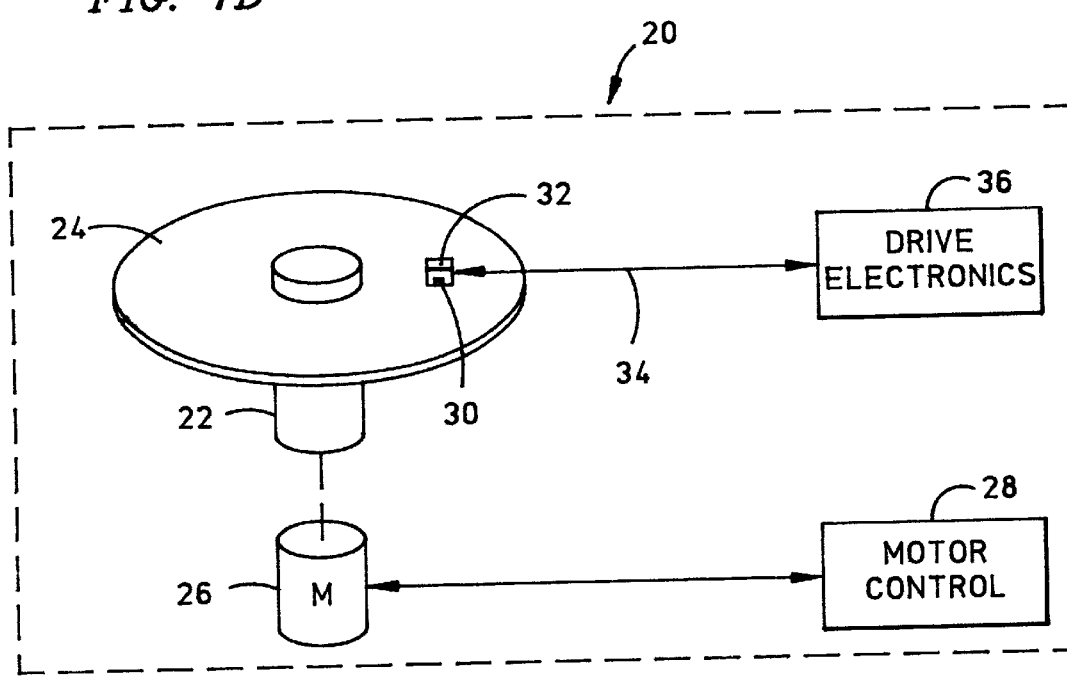

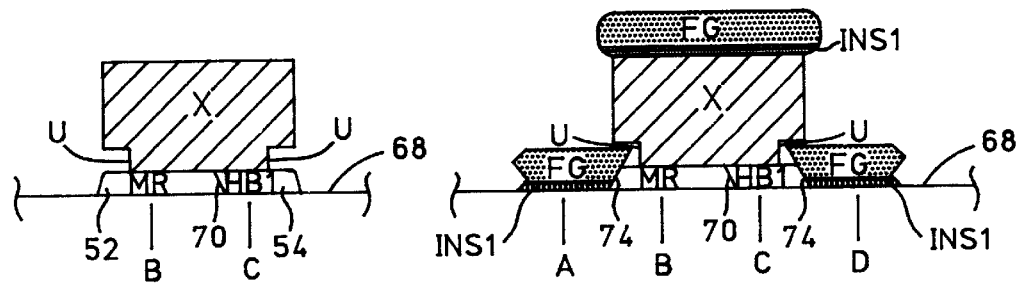
FIG. 6G    FIG. 6H
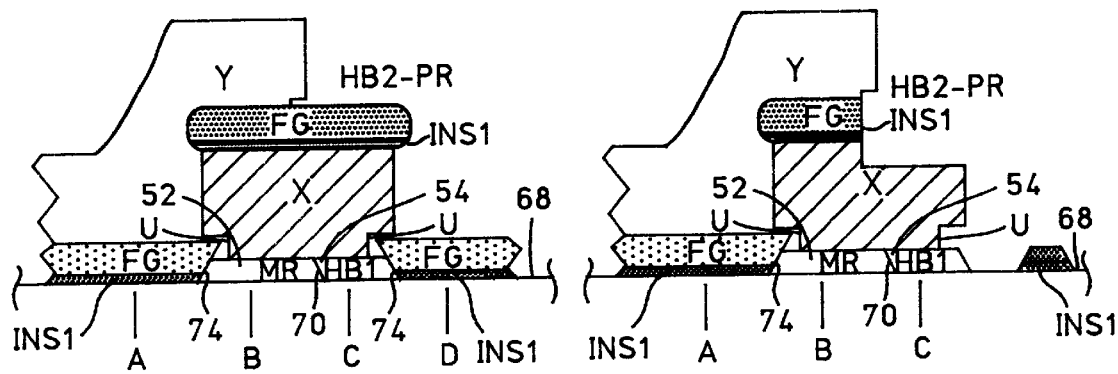
FIG. 6I    FIG. 6J
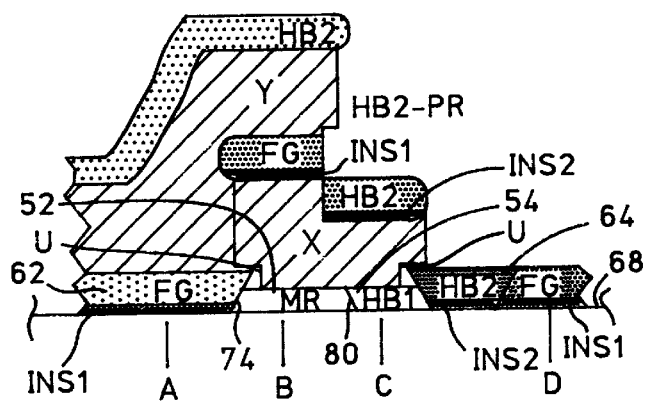
FIG. 6K
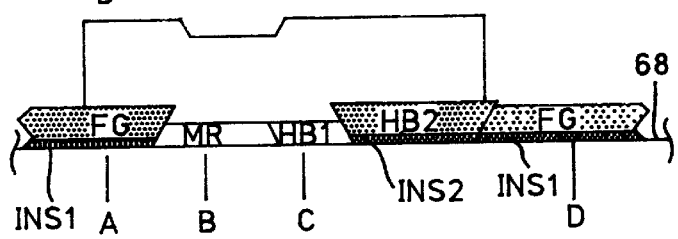
FIG. 6M
FIG. 6L

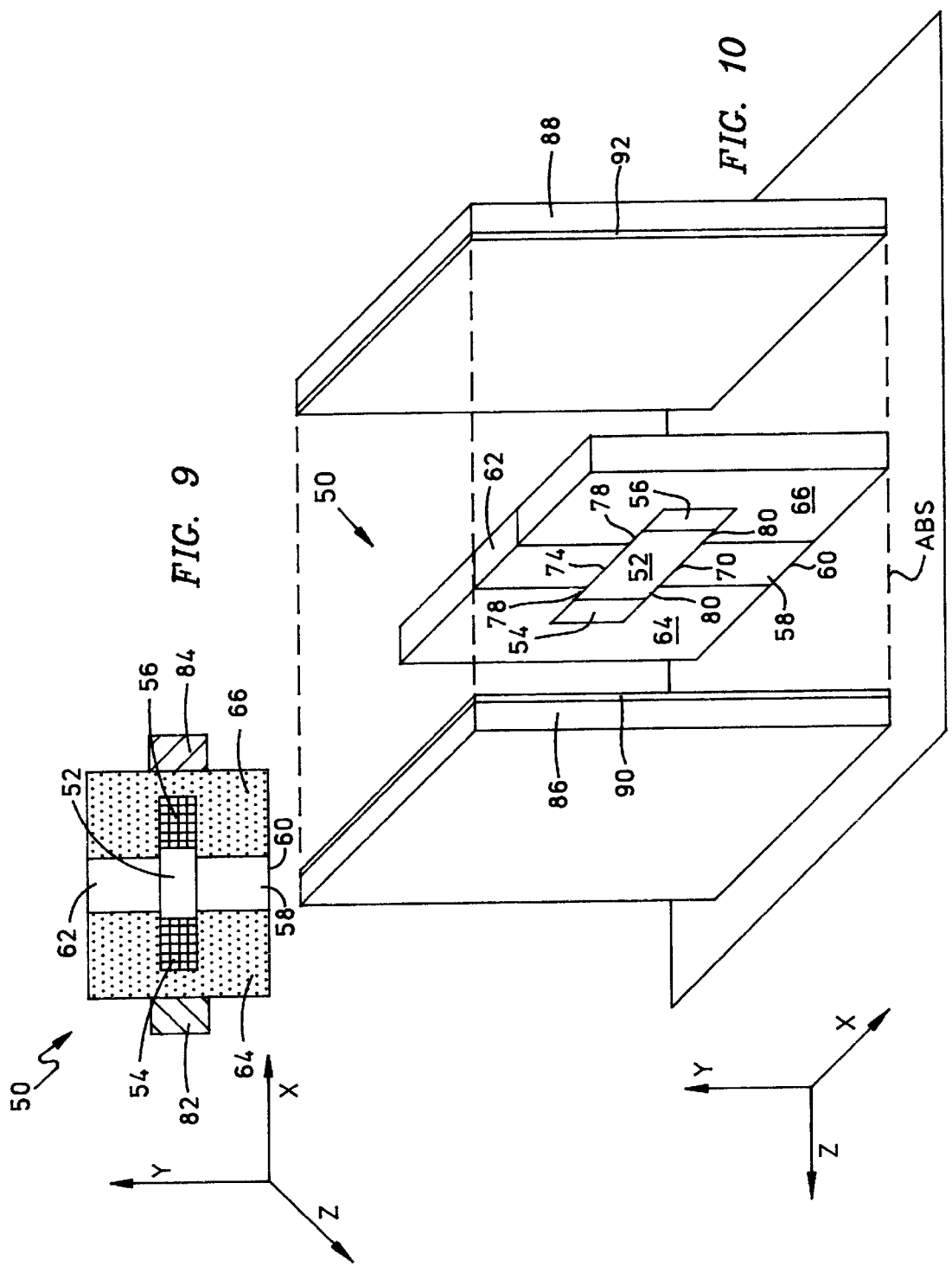

DOUBLE SELF-ALIGNED INSULATED CONTIGUOUS JUNCTION FOR FLUX-GUIDED-MR OR YOKE-MR HEAD APPLICATIONS

BACKGROUND OF THE INVENTION

1. Field of the Invention

The present invention is directed generally to magnetic heads for data storage applications, and more particularly, to thin film magnetic heads having flux-guided-MR or yoke-MR read sensors and methods for forming such heads.

2. Description of the Related Art

MR (magnetoresistive) sensors made by thin-film processes have been widely used in recent years for magnetic storage applications, particularly in disk drives. One of the properties of these sensors is that they vary in electrical resistance when placed in magnetic fields, such as the magnetic domains that represent recorded information on magnetic storage media. In disk drive applications, an MR read head having an MR sensor therein is carried on a slider mounted on a suspension. The suspension, in turn, is mounted to an actuator. The suspension mechanically biases the slider toward a surface of the disk. When the disk rotates, the loading is counterbalanced by a cushion of air (an "air bearing") generated by the rotating disk. The actuator moves the head to selected information tracks on the rotating magnetic disk. The resistance of the MR sensor changes in proportion to the change in magnetic field intensity caused by rotation of the disk. When a sense current is conducted through the MR sensor, the current changes in proportion to the change in resistance. Changes in the sense current are processed by a processor to produce playback signals corresponding to the information stored on the magnetic disk.

An MR sensor includes a stripe of MR material sandwiched between a pair of very thin insulative gap layers which are, in turn, sandwiched between a pair of magnetically conductive shield layers. Magnetic flux reaching the MR sensor extends through the gap layers to the shield layers. The MR sensor has front and back edges extending parallel to air bearing surface (ABS) of the slider on which it is carried. The MR sensor further includes a pair of side edges extending perpendicular to the ABS. The magnitude of magnetic flux that reaches the MR sensor is at a maximum at the front edge thereof. This magnitude decays along the MR stripe height and into the shields with a characteristic decay length. A boundary condition requires the flux magnitude to be zero at the back edge. When the stripe height of the MR sensor from the front to the back edge is less than the decay length, the flux loss along the height of the MR sensor is linear.

The MR sensor, which has a layer of magnetic material, is typically stabilized by a pair of hard bias (or exchange bias) layers adjacent its side edges. The hard bias layers longitudinally bias the MR sensor parallel to the ABS and stabilize the MR sensor from a multi-magnetic domain state to a single magnetic domain state. Accordingly, upon the termination of flux incursions into the MR sensor, the sensor always returns to a stabilized single magnetic domain state. Without longitudinal biasing, the domain walls of multi-magnetic domains shift positions within the sensor, causing Barkhausen noise. This decreases the signal to noise ratio.

In some MR heads, the front edge of the MR sensor is exposed at the ABS and interfaces with the air bearing. To increase the amount of magnetic flux sensed by the MR sensor, and the intensity of the readback signal, a flux guide is connected to the back edge of the MR sensor and extends away from the ABS. In other MR heads, the MR sensor is recessed from the ABS. A second flux guide is connected to the front edge of the MR sensor and extends to the ABS. The second flux guide carries flux from the ABS to the MR sensor.

Recessed MR sensors are being pursued as attractive alternatives to MR sensors positioned at the ABS. Although the signal strength is reduced when the MR sensor is removed from the ABS, significant advantages achieved in the mechanical, electrical and chemical properties of the head may provide an acceptable tradeoff in many applications. From a mechanical standpoint, decreasing flying heights become possible and thermal asperity problems are minimized because there is less likelihood that the MR sensor will be damaged should the head contact the disk surface. From an electrical standpoint, the front flux guide insulates the current-carrying MR sensor and reduces the possibility of electrostatic discharge between the sensor and the disk. From a chemical standpoint, removal of the MR sensor from the disk means there is less chance that corrosion of the sensor will damage the disk. It therefore becomes possible to use less corrosion resistant materials for the MR sensor, which may provide performance benefits and reduce manufacturing costs.

For high density, post 1 Gbit/sq. in. trackwidths, it is generally accepted that the flux guides in recessed and nonrecessed heads need to be stabilized with hard bias (or exchange bias) by pinning the two sides of the flux guides with magnetically matched plugs in a fashion similar to the hard bias (or exchange bias) layers adjacent the MR sensor. Proper magnetic stabilization of MR heads thus requires the use of proper bias matching to both the MR sensor and the flux guides. The flux guide to sensor thickness ratio can be as large as twenty (20), particularly in yoke-MR heads, where one of the shields is used as a flux guide. As such, two separate depositions of hard bias material at different thicknesses are typically required.

One of the challenges of building a flux-guided-MR or yoke-MR sensor is the alignment of various edges with respect to each other to optimize flux guiding efficiency and proper bias matching. FIGS. 1A–1C show a sequence for building an MR sensor, which in the example is shown as having a sensor element that is recessed, but which could also have a nonrecessed sensor for purposes of the present discussion. Both the sensor element, which is made from a magnetoresistive material "MR," and the flux guide elements, which are made from a flux guide material "FG," are stabilized with separate longitudinal bias regions made from hard bias materials "HB1" and "HB2," respectively. Exchange bias could also be used. The structure shown in FIGS. 1A–1C is common for both yoke-MR heads, where one of the shields provides the flux guides and the other shield provides a return pole above the illustrated structure (i.e. in the z-axis direction), and flux-guided MR heads, where separate flux guides are employed and the illustrated structure is embedded between two shields. In FIG. 1A, an MR sensor layer 2 is deposited on a substrate 3, followed by two HB1 hard bias layers 4 and 6 formed along the sides of the MR sensor layer 2. In FIG. 1B, a pair of FG flux guides 8 and 10 are deposited on the substrate adjacent the front and rear edges of the MR sensor 2 and the hard bias layers 4 and 6. In FIG. 1C, two HB2 hard bias layers 12 and 14 are formed on the flux guide 8 and two HB2 hard bias layers 16 and 18 are formed on the flux guide 10. The critical point in the process is achieving y-direction alignment of the flux guide hard bias material layers 12–18 relative to the flux guides 8 and 10 on one hand, and the MR sensor 2 on the other. Misalignment of the HB2 hard bias layers causes either an overlap of the hard bias material into the MR sensor area or an absence of hard bias material in the flux guide area, resulting in the overbias of the sensor or an underbias of the flux guide material. The misalignment is illustrated by the structure shown in FIG. 1D.

The prior art method of making junctions between head components thus does not precisely position a hard bias layer at the edge portions of the flux guide and the MR sensor. The reason for this is because the prior art employs two resist masking steps. Under the best of conditions the alignment of a critical edge of the resist mask from a benchmark on a wafer is within +/−0.1 um. Another problem arises from unpredictable shrinkage of the resist. The location of the critical edge of the resist due to shrinkage varies +/−0.1 um. Even when windage is employed to attenuate the shrinkage problem, shrinkage is still variable from wafer to wafer. For any wafer containing multiple MR heads with flux guides and hard bias layers constructed according to the prior art, the yield will thus be unacceptably low because of the variability in hard bias layer alignment.

Accordingly, one cannot rely on photolithographic alignment for hard bias positioning in MR heads. An improved process is needed to ensure proper hard bias alignment and thereby improve the magnetic stabilization of the sensor and flux guides. What is required is an efficient method for closely controlling the deposition of the hard bias layers with consistent accuracy in order to improve manufacturing yields.

SUMMARY OF THE INVENTION

In accordance with the foregoing objectives, a magnetoresistive (MR) head made in accordance with the present invention is formed with an MR sensor structure and a biased guide joined thereto. The guide is formed using a first resist mask applied over the MR sensor structure. A guide biasing structure is formed using the first resist mask and a second resist mask applied over the first resist mask and the guide. The first resist mask is configured to form a double self-aligned contiguous junction between the MR sensor structure and both the guide and the guide bias structure. In this manner, the position of the guide biasing structure is carefully controlled so that it does not overlap the MR sensor structure.

BRIEF DESCRIPTION OF THE DRAWINGS

The objects, advantages and features of the present invention will be more clearly understood by reference to the following detailed disclosure and the accompanying drawings in which:

FIGS. 1A–1D are plan views looking down on a wafer substrate showing the construction of an MR sensor using a prior art fabrication process;

FIG. 2 is a schematic illustration of an exemplary magnetic disk drive which includes the present invention;

FIGS. 6A–6M are cross-sectional views corresponding to FIGS. 5A–5N showing steps for making an MR sensor as illustrated in FIG. 4 using a fabrication process of the present invention;

FIG. 9 is a side view of an MR sensor made in accordance with the present invention with attached electrical leads;

FIG. 10 is an exploded perspective view showing an MR sensor made in accordance with the present invention disposed between a pair of shields and insulative gap layers in a magnetic head.

DETAILED DESCRIPTION OF THE PREFERRED EMBODIMENTS

Figure 3A:
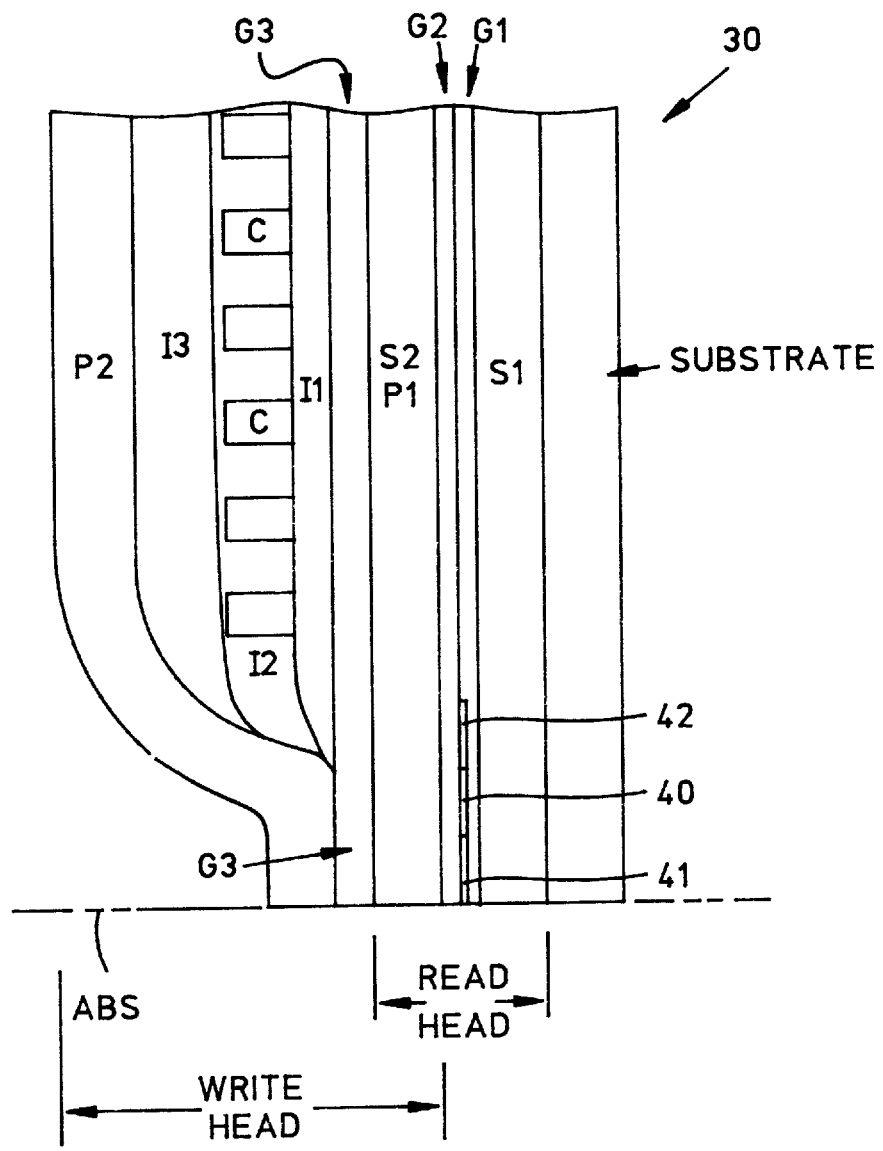
FIG. 3A is a vertical cross-section of a flux-guided-MR head which includes the present invention.

Referring now to the drawings wherein like reference numerals designate like or similar parts throughout the several views, there is illustrated in FIG. 2 a disk drive 20. The drive 20 includes a spindle 22 which supports and rotates at least one magnetic disk such as the magnetic disk 24. The spindle 22 is rotated by a motor 26 which is governed by motor control 28. A thin film magnetic head 30 of the present invention is mounted on a slider 32, the slider being supported by a suspension and actuator arm 34. The suspension and actuator arm 34 positions the slider 32 so that the head 30 is in a transducing relationship with a surface of the magnetic disk 24. When the disk 24 is rotated by the motor 26, air is moved by the surface of the disk, causing the slider to ride on an air bearing slightly off of the surface, on the order of 0.75 microns. The head 30 is then employed for writing information to multiple circular tracks on the surface of the disk 24 as well as reading information therefrom. These information signals, as well as servo signals for moving the slider to various tracks, are processed by drive electronics 36.

FIG. 3A is a cross-sectional illustration of the head 30 which includes a read head portion and a write head portion. The head 30 is shown in FIG. 3A in a flux-guided-MR sensor embodiment. The head 30 is lapped to form an air bearing surface (ABS), the ABS being spaced from the surface of the rotating disk by the air bearing as discussed hereinabove. The read head portion includes an MR sensor element 40, a front flux guide 41 and a rear flux guide 42, which are sandwiched between first and second gap layers G1 and G2 that are, in turn, sandwiched between first and second shield layers S1 and S2. The write head portion includes a coil layer C and insulation layer I2 which are sandwiched between insulation layers I1 and I3 which are, in turn, sandwiched between first and second pole pieces P1 and P2. A gap layer G3 is sandwiched between the first and second pole pieces at their pole tips adjacent the ABS for providing a magnetic gap. When signal current is conducted through the coil layer C, flux is induced into the first and second pole layers P1 and P2 causing flux to fringe across the pole tips at the ABS. This flux magnetizes circular tracks on the rotating disk 24, shown in FIG. 2, during a write operation. During a read operation, magnetized regions on the rotating disk inject flux into the MR sensor of the read head, causing resistance changes in the MR sensor. Sensor resistance changes are detected by detecting changes of a sense voltage across the MR sensor. The voltage changes are processed by the drive electronics 36 shown in FIG. 2. The combined head illustrated in FIG. 3 is a "merged" MR head in which the second shield layer S2 of the read head is employed as a first pole piece P1 for the write head. In a piggyback head (not shown) the second shield layer S2 and the first pole piece P1 are separate layers.

Figure 3B:
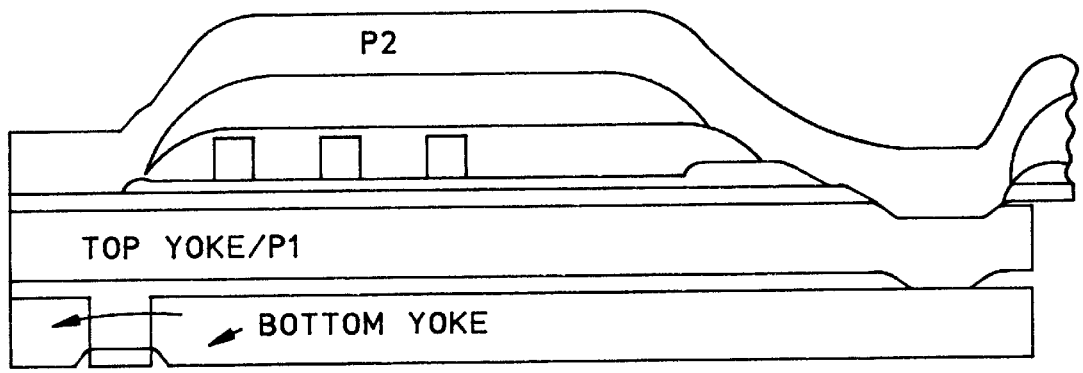
FIG. 3B is a vertical cross-section of a yoke-MR head which includes the present invention.

FIG. 3B is a cross-sectional illustration of the head 30 in a yoke-MR embodiment. It is similar in all respects to the head structure shown in FIG. 3A except that the shield S1 provides the front and rear flux guides 41 and 42. The back end of the shield S1 is also electrically connected to the S2 shield, which provides a return pole in the read head.

Figure 4A:
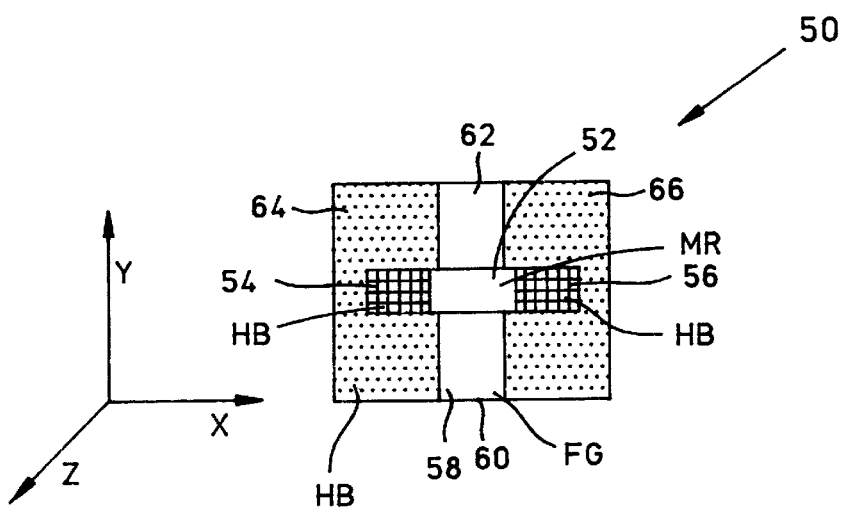
FIGS. 4A and 4B are side elevation views of recessed MR sensors constructed in accordance with the present invention.
Figure 4B:
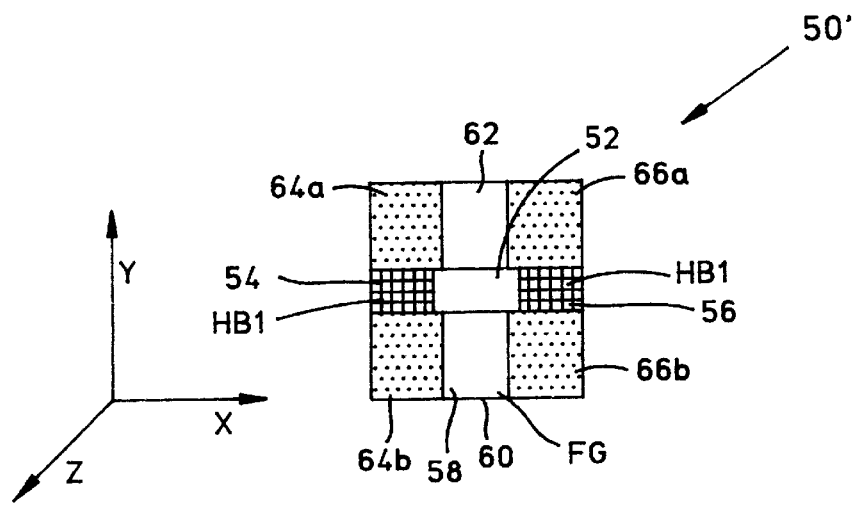

FIGS. 4A and 4B illustrate recessed MR sensors made in accordance with the present invention, either of which could be used to form the MR sensor 40 element and the front and rear flux guides 41 and 42 shown in FIG. 3.

In FIG. 4A, the sensor 50 includes a MR sensor element 52, made from a layer of sensor material "MR," which is preferably a soft ferromagnetic material having low coercive force, such as Permalloy (NiFe). The sensor 50 also includes a pair of hard bias layers or plugs 54 and 56, made from a first layer of hard bias material "HB1" which is preferably a hard magnetic material having a high magnetic moment and high coercive force. Examples include alloys of Cobalt, Chromium and Platinum (CoCrPt), Cobalt and Chromium (CoCr), and Cobalt, Chromium and Tantalum (CoCrTa). Alternatively, instead of using a hard bias material, an exchange bias material could be substituted for the hard bias plugs 54 and 56. In that case, the exchange bias plugs would be formed with a first layer of soft magnetic material, such as Permalloy (NiFe), and a second layer of antiferromagnetic material, such as an alloy of Nickel and Manganese (NiMn), or an alloy of Iron and Manganese (FeMn) or an alloy of Terbium and Cobalt (TbCo). The hard bias plugs 54 and 56 extend from opposite side edges of the MR sensor element 52 to provide longitudinal magnetic stabilization thereof. A front flux guide 58, made from a layer of flux guide material "FG," such as Permalloy (NiFe) or Sendust (AlSiFe), extends from a front edge of the MR sensor 52 to an ABS 60. The magnetic moment of the FG flux guide material may be one to four times the magnetic moment of the MR material. The ABS lies in the x-z plane of FIG. 4A and relative motion between the head 50 and an underlying magnetic medium (not shown) occurs in the z-axis direction. In this orientation, it will be seen that the front flux guide 58 corresponds to a track width dimension on the medium. A rear flux guide 62, made from a layer of the FG flux guide material, extends from a rear edge of the MR sensor element 52 away from the ABS 60. A plurality of hard bias layers or plugs 64 and 66, made from a second hard bias layer "HB2" which may be the same as the HB1 material, stabilize the flux guides 58 and 62. Exchange bias material could also be used. In flux-guided MR sensor applications, the flux guides 58 and 62 would not be used as shields. In yoke-MR sensor applications, the flux guides 58 and 62 would be constructed to function as shields.

FIG. 4B illustrates an alternative embodiment of the sensor 50' in which there are four distinct, separate HB2 regions, each in a respective corner of the sensor. These regions are numbered 64a, 64b, 66a, and 66b to emphasize that they have the same purpose, and produce the same effect as the HB2 regions 64 and 66 in the sensor of FIG. 4A. All other elements of the sensor shown in FIG. 4B are identical to the identically numbered elements if FIG. 4A, and the sensor 50' of FIG. 4B operates in the same way, and produces the same effect, as the sensor 50 of FIG. 4A.

FIGS. 5A–5L, and FIGS. 6A–6L, show a sequence of process steps wherein the "y" positions of the two separate pairs of hard bias plugs 54,56 and 64,66 are essentially self aligned by retaining a resist mask used to form an alignment edge between the MR sensor 52 and the flux guides 58 and 62, and then adding new resist mask and performing liftoff processing to create the desired shape. As will now be explained, the regions for the flux guide hard bias plugs 64 and 66 are bounded by old resist in one critical direction and new resist in the other critical direction.

In FIGS. 5A–5F, the MR sensor element 52 is formed on a wafer substrate 68, along with the hard bias plugs 54 and 56. These structures are preferably formed using a self-aligned contiguous junction process such as that disclosed in commonly assigned U.S. Pat. No. 5,018,037 to Krounbi et al., the disclosure of which is hereby incorporated herein by this reference. The Krounbi et al. patent teaches the making of a noninsulated, contiguous self-aligned junction between conductive layers, such as an MR sensor and leads. Only one resist mask is employed which serves a double function, namely defining an end of the MR sensor and depositing the lead material to make electrical contact with the end.

Figure 5A:
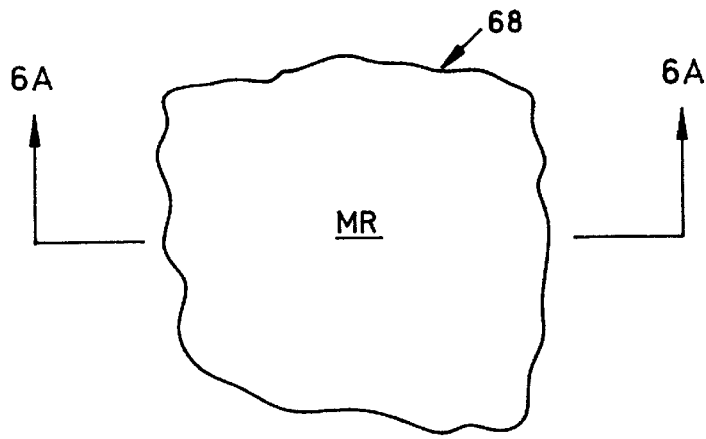
FIGS. 5A–5N are plan views looking down on a wafer substrate showing the construction of an MR sensor as illustrated in FIG. 4 using a fabrication process in accordance with the present invention.
Figure 5B:
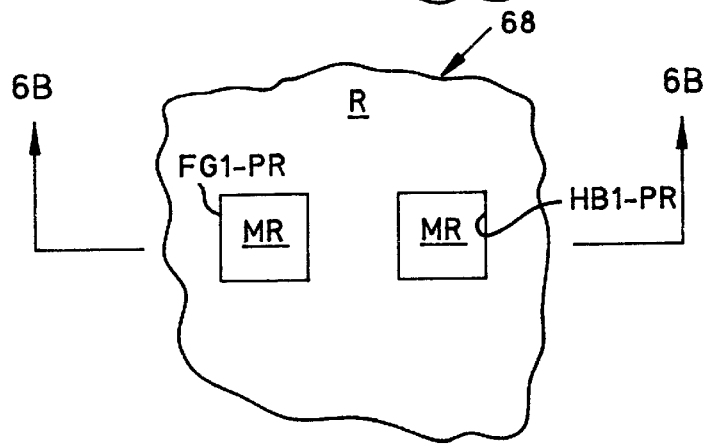
Figure 5C:
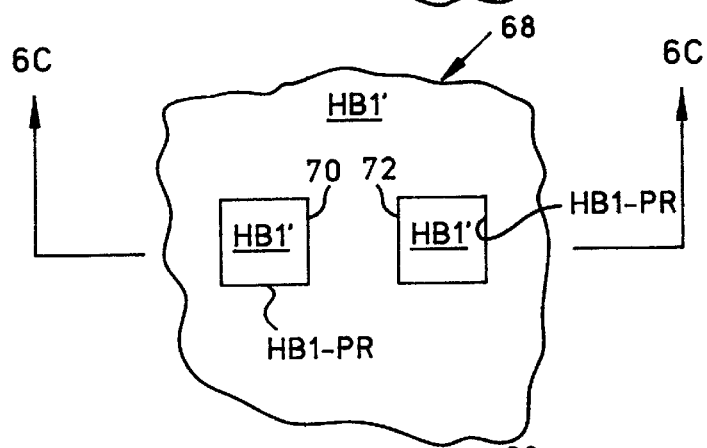
Figure 6A:
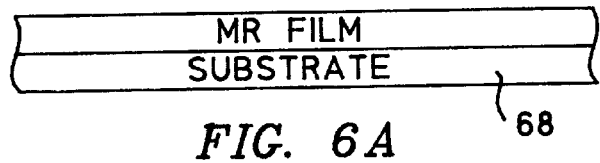
Figure 6B:
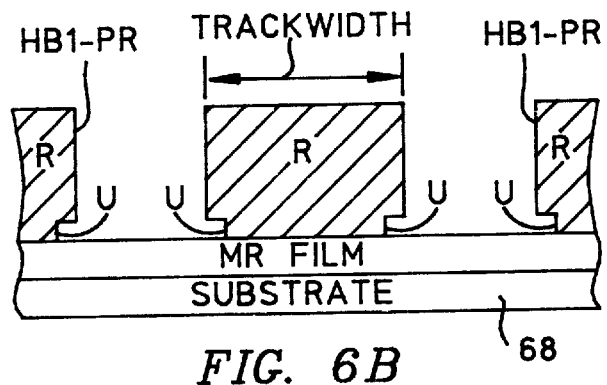
Figure 6C:
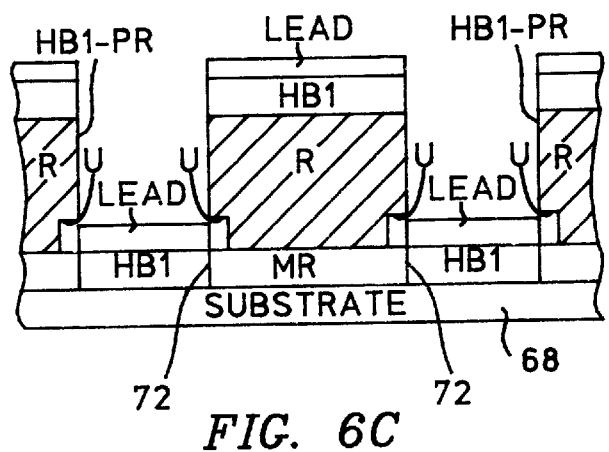

Adapting the Krounbi et al. method to the present invention, a full film of sensor material MR is deposited on the substrate 68, as shown in FIGS. 5A and 6A. The structure is then covered with a layer of material "R" and the resist is patterned to form a mask that defines a pair of openings HB1-PR, as shown in FIGS. 5B and 6B. The material R may be any material that can be used for a subsequent liftoff process without chemically attacking the sensor and hard bias material underneath. For instance, it could be post baked resist or alumina. Subsequent ion milling of the sensor material MR produces a pair of side edges in the MR material defined by the R mask. As shown in FIGS. 5C and 6C, a layer of HB1 hard bias material, followed by a layer of electrical lead material, is deposited in each of the openings HB1-PR. For clarity, the HB1 material and the electrical lead material are collectively designated as "HB1'" in the figures.

As shown in FIGS. 6B and 6C, the R mask has a peripheral undercut "U" that extends around the sides of the openings. The undercut U provides a negative undercut profile. It can be readily formed if the R mask is made in two layers, with the bottom layer being of a resist material which develops isotropically in a developer in contrast to the upper layer of resist material which does not dissolve in the developer. The height of the undercut U is controlled by the thickness of the lower layer of resist material and the depth of the undercut U is controlled by the time in the developer. A typical rate of depth growth in the developer is 0.05 um/minute. Accordingly, the depth of the undercut U can be controlled fairly accurately.

Figure 7A:
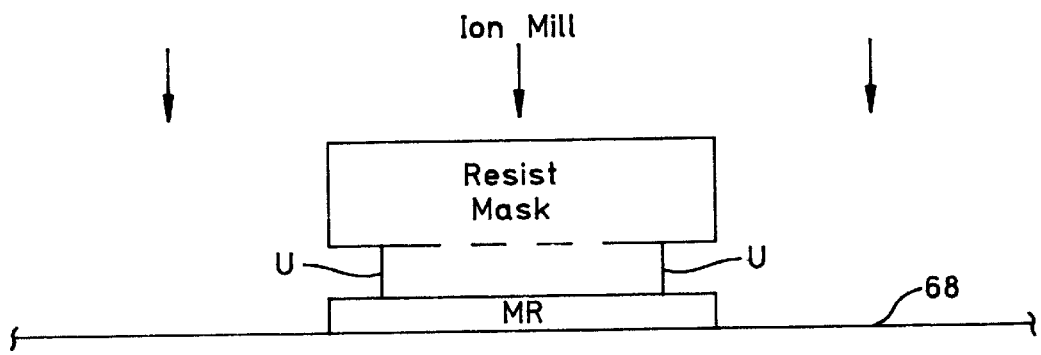
FIGS. 7A–7C show fabrication details in accordance with one embodiment of the process illustrated in FIGS. 5A–5L and 6A–6L.
Figure 7B:
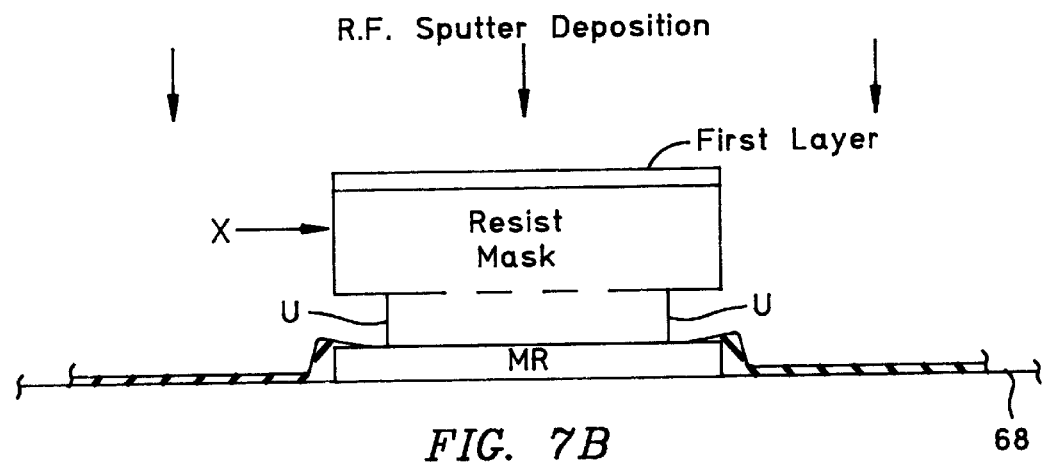
Figure 7C:
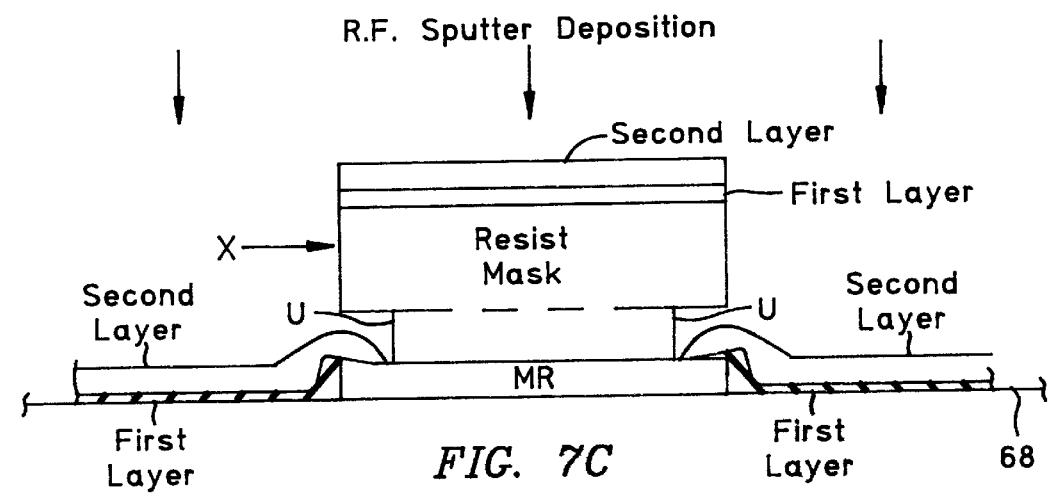

The undercut U in the R mask ensures that the hard bias layer HB1 and the electrical lead layer overlap the MR sensor layer at the junctions between these structures. Importantly, the amount of overlap is precisely controlled by using the R mask to both define both the edges of the MR sensor material and the overlapping edges of the hard bias layer HB1 and the electrical lead layer. Depending on the method used to deposit the HB1 and electrical lead layers, the resultant overlap may be tapered or nontapered. R.F. sputtering is used when a tapered overlap is desired. R.F. sputtering is done in an atmosphere of 40×10−3 torr. Within a chamber at this pressure, argon ions bombard a target which releases insulation ions. After complete deposition of the first layer, the target is switched to a metallic material upon which deposition resumes until the electrical lead layer is deposited. The target ions traverse an argon atmosphere which causes a lot of collisions and isotropic deposition. Accordingly, the deposition is directed not only downwardly but at an angle into the undercut U causing the overlapping depositions. This is shown in FIGS. 7A–B, with the HB1 material representing the "FIRST LAYER" and the electrical lead material representing the "SECOND LAYER." The thickness of each deposited layer becomes less as the undercut U becomes deeper causing the tapered configuration of the FIRST LAYER and the SECOND LAYER as they project within the undercut. The result is a very accurate contiguous self-aligned junction.

Figures 8A, 8B:
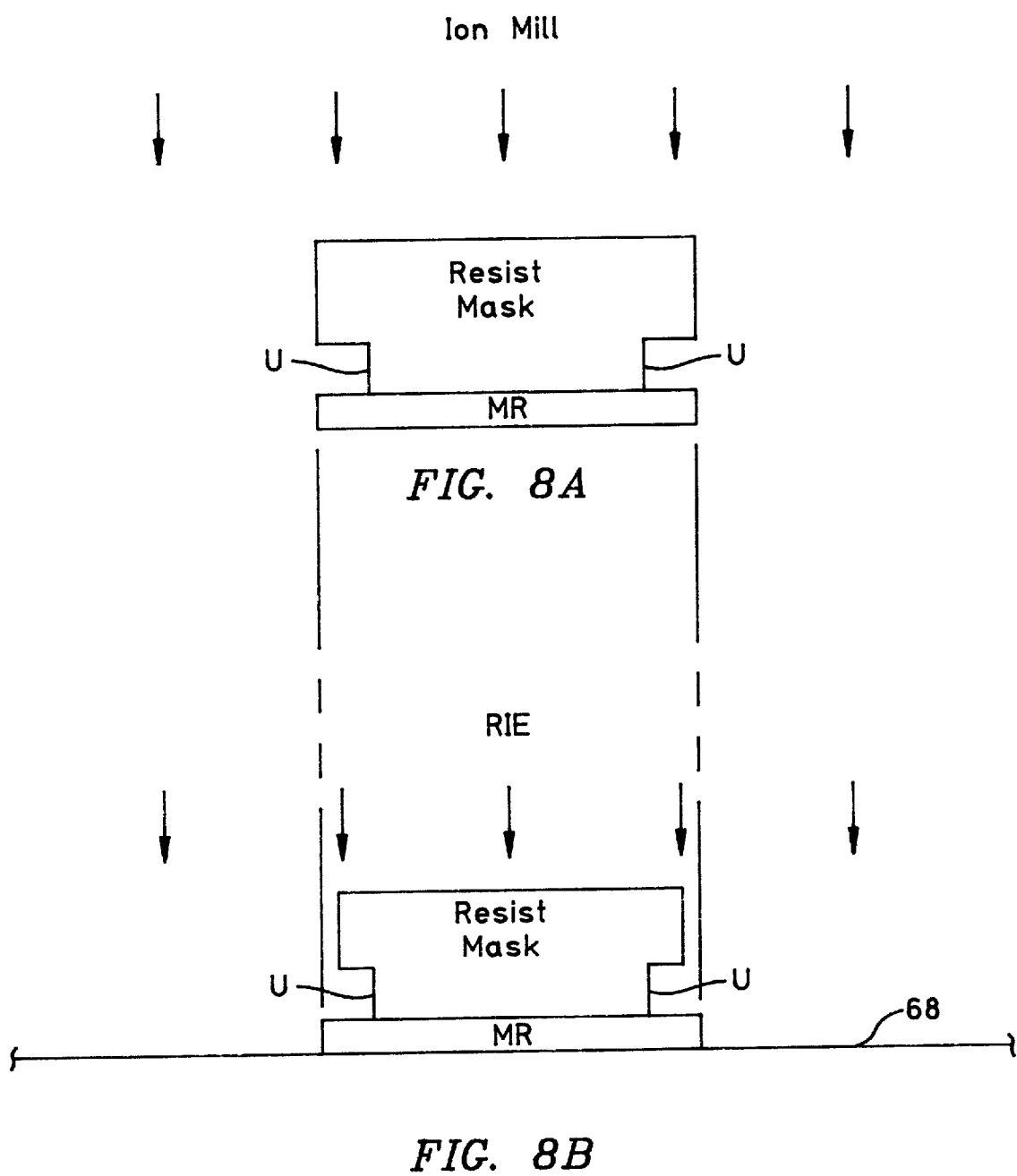
FIGS. 8A–8D show fabrication details in accordance with another embodiment of the process illustrated in FIGS. 5A–5L and 6A–6L.
Figure 8C:
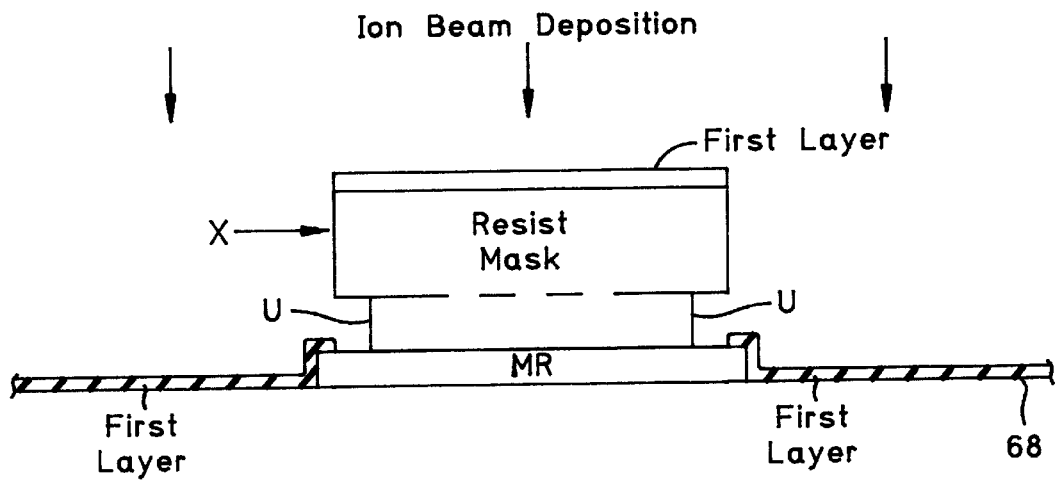
Figure 8D:
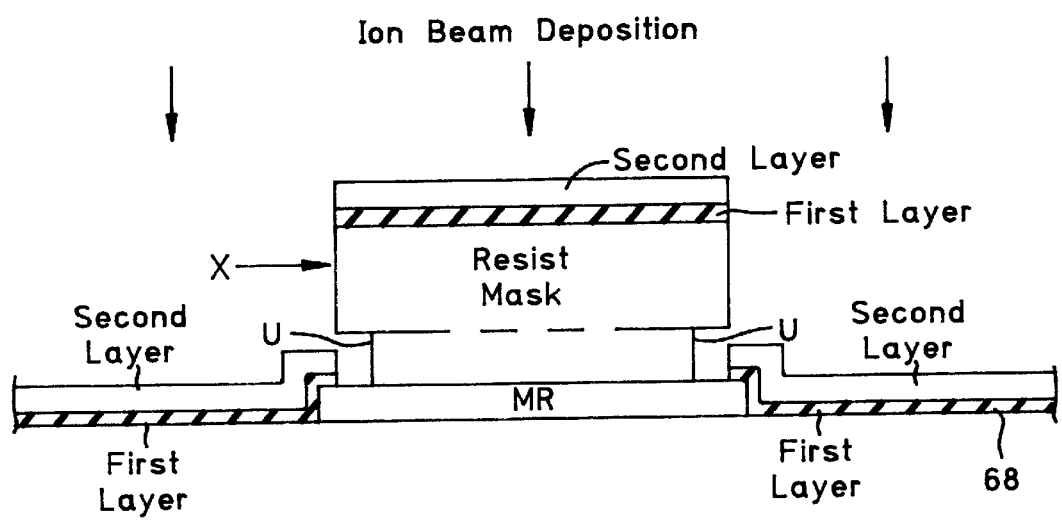

In another method of deposition, edges of the R mask are etched by a reactive plasma such as oxygen. This cause the edges of the R mast to be formed inwardly, as shown in FIGS. 8A and 8B. The amount of inward etching of the R mast edges will control the amount of overlap of the FIRST LAYER and the SECOND LAYER on the MR material layer. The next step is to form the FIRST LAYER and the SECOND LAYER by a directional process, such as ion beam deposition, as shown in FIGS. 8C and 8D. The result is again a very accurate contiguous self-aligned junction. The FIRST LAYER and the SECOND LAYER do not taper as they overlap the end edge portions of the MR material because their depositions are very directional. In this embodiment the undercut U in the R mask is employed only for liftoff of the resist mask and layers thereon.

Figure 5D:
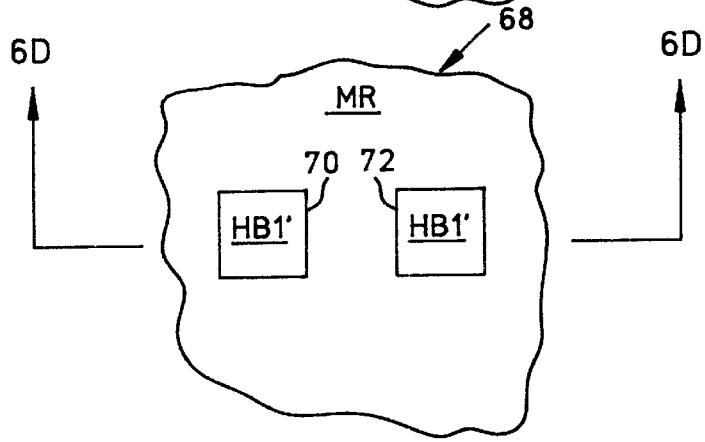
Figure 6D:
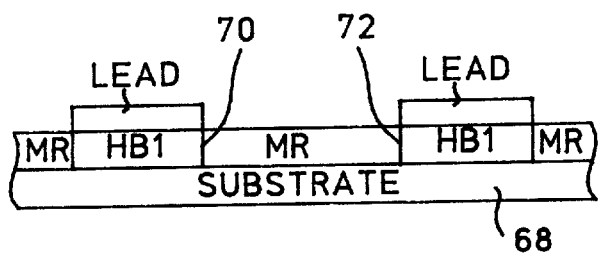

The deposition processes of FIGS. 7A–7C and 8A–8D can be used form a pair of noninsulated, self aligned contiguous junctions 70 and 72 extending in the y-axis direction between the sensor material MR and the hard bias material HB1 and the electrical lead material. The junctions 70 and 72 are illustrated in FIGS. 5C and 6C. They define contiguous side edges of the incipient MR sensor element 52 and its adjacent hard bias plugs 54 and 56, as shown in FIG. 4. The MR sensor element 52 and the hard bias plugs 54 and 56 are not complete at this point because the end edges of the MR sensor, and the side and end edges of the hard bias regions, are not yet defined. A second mask needs to be applied in order to define the end edges of the MR sensor element 52 and the side and end edges of the adjacent hard bias plugs 54 and 56. First, however, the R mask needs to be removed. This is shown in FIGS. 5D and 6D. Lift off is achieved by applying a solution that dissolves the lower undercut layer of the R mask.

Figure 5E:
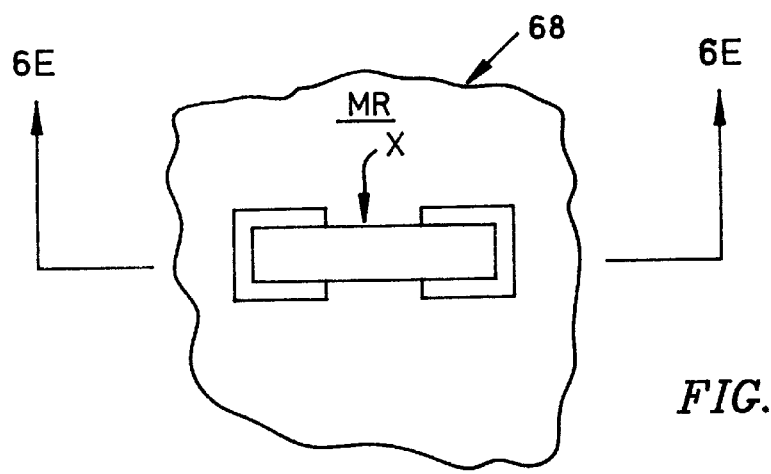
Figure 5F:
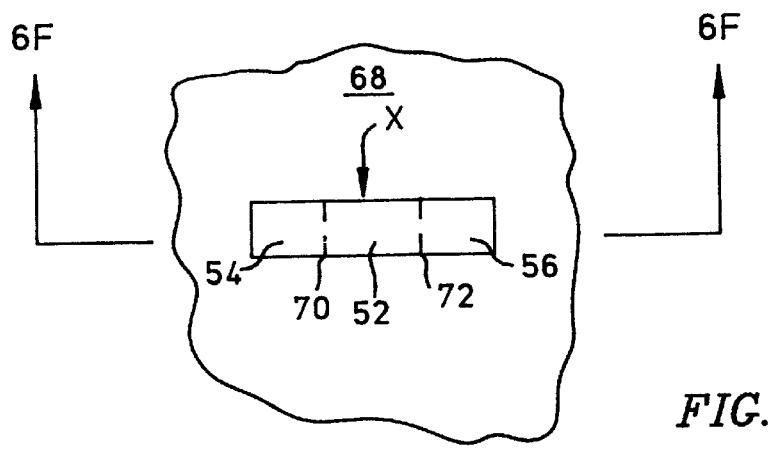
Figure 6E:
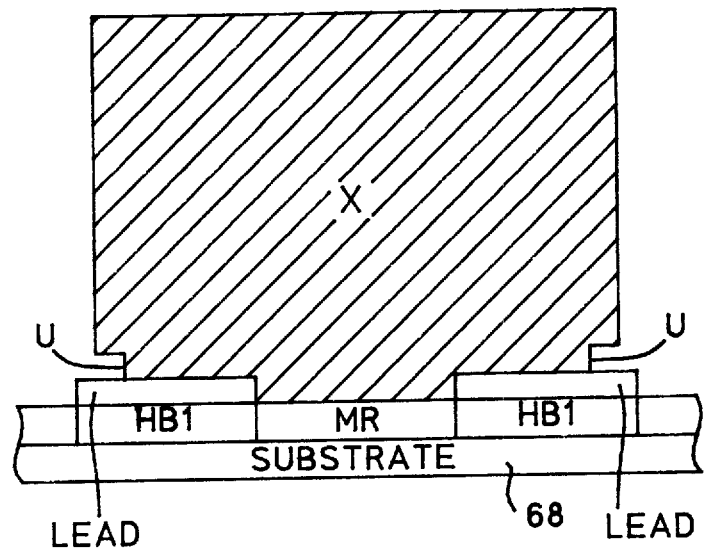
Figure 6F:
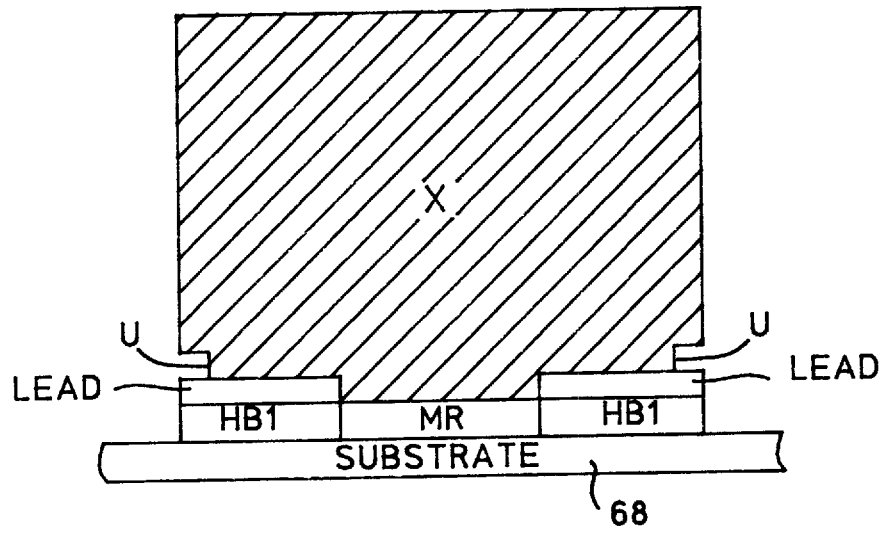

As shown now in FIGS. 5E and 6E, a layer of material ("X") is deposited above the full film of sensor material MR and hard bias material HB1 and then patterned to form an X mask. The material X may be any material that can be used for a subsequent liftoff process without chemically attacking the sensor and hard bias material underneath. For instance, it could be post balked resist or alumina. With the mask X in place, the layers of sensor material MR and hard bias material HB1 are patterned using the X mask by ion milling, as shown in FIGS. 5F and 6F. The X mask defines the end edges of the MR sensor element 52 and the side and end edges of the hard bias plugs 54 and 56.

Figure 5G:
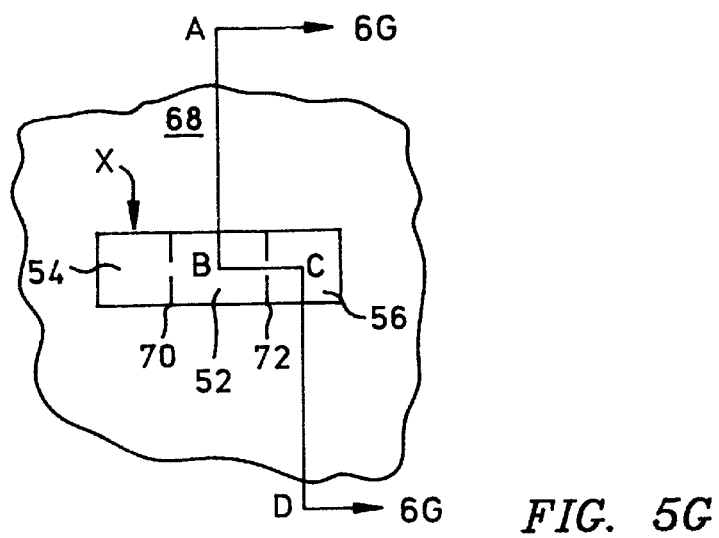

With the X mask remaining in place, the flux guide layers can now be added. FIGS. 5G and 6G shown another cross-section of the structure of FIGS. 5F and 6F for purposes of illustrating the remaining steps of the process. These figures show that the edges of the MR sensor element 52 and the hard bias plugs 54 and 56 are tapered. This results from the ion milling process, which is usually performed at a non-vertical angle, as shown in FIGS. 4 and 5 of the aforementioned Krounbi et al. patent.

Figure 5H:
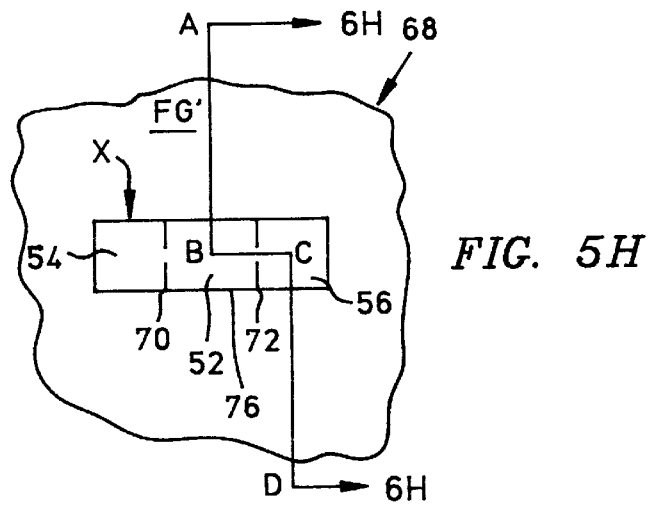

In FIGS. 5H and 6H, an insulation layer INS1, made from alumina (Al2O3) or the like, is deposited on the substrate 68, and an FG flux guide layer is then deposited over the INS1 layer. For clarity, the INS1 and FG layers are collectively designated "FG'" in the figures. The INS1 and FG layers may be formed in accordance with either of the processes of FIGS. 7A–7C or 8A–8D. The INS1 material would form the "FIRST LAYER" in those figures, and the FG material would form the "SECOND LAYER." As described above in connection with FIGS. 7A–7C, and 8A–8D, the undercut U in the X mask ensures that the insulation layer INS1 and the flux guide layer FG overlap the MR sensor element 52 at the junctions 74 and 76. As with the HB1 and electrical lead layers previously described, the amount of overlap is precisely controlled by using the X mask to both define both the end edges of the MR sensor element 52 and the overlapping end edges of the insulation layer INS1 and the flux guide layer FG. This is particularly important for flux guide deposition. One of the problems of prior art flux guide fabrication techniques is the difficulty in controlling the amount of overlap, which directly impacts the efficiency of the MR sensor element 52. If the MR sensor element 52 abuts the flux guides 58 and 62 with no overlap, very little flux will be transferred across the narrow insulation INS1 layer into the flux guides, reducing the signal strength in the MR sensor and increasing the potential for shorting between the flux guides and the second shield 52 (see FIGS. 3A and 3B) due to potential pinholes in the second gap layer G2 and the insulation layer. If there is too much overlap, the flux guides 58 and 62 will prematurely withdraw flux from the MR sensor element 52, thereby reducing signal strength. An acceptable overlap in the art of recessed sensors has been found to be about 10% of the stripe height of the sensor.

The X mask defines a pair of insulated, self aligned contiguous junctions 74 and 76, extending in the x-axis direction between end edges of the MR sensor element 52 and the INS1 and FG material layers which will become the flux guides 58 and 62. In addition, in accordance with an important aspect of the present invention, it is asserted that it is also possible to use the X mask to provide a double self aligned insulated contiguous junction that includes not only the junctions 74 and 76, but also additional junctions 78 and 80 (see FIGS. 5I and 6I) formed between the MR sensor element 52 and the hard bias plugs 64 and 66. Advantageously, the junctions 78 and 80 can be co-aligned with the junction 74 and 76, such that there is double alignment of the flux guides 58 and 62 on one hand, and the hard bias plugs 64 and 66 on the other hand, to the same reference edges of the MR sensor element 52.

Figure 5I:
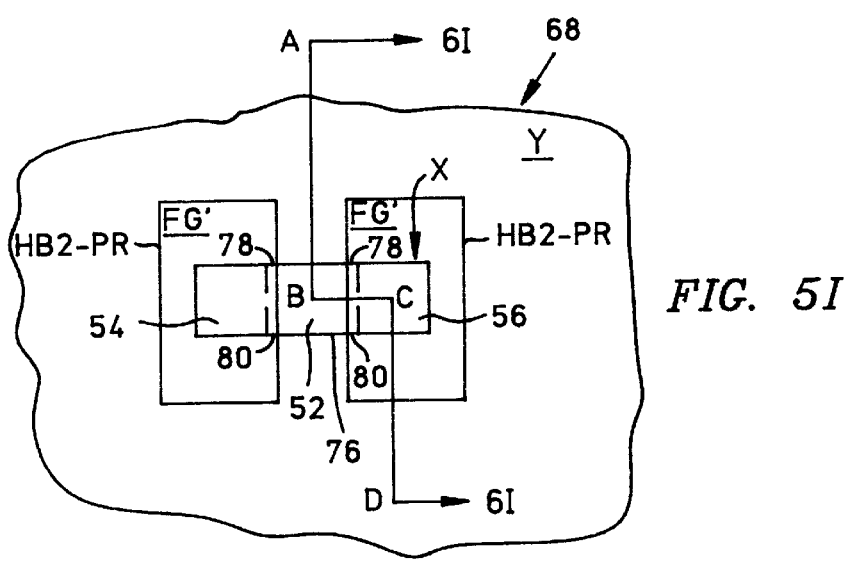

As shown in FIGS. 5I and 6I, after deposition of the INS1 and FG layers, a layer of material Y is spun over the whole wafer and exposed through a mask that leaves two openings "HB2-PR." The Y material may be post baked resin or alumina so as to be capable of subsequent lift off. The openings HB2-PR are used to form the hard bias plugs 64 and 66. They are "x" aligned so that the inner side edges 82 and 84 thereof cross the MR sensor element 52 inwardly of the MR sensor side edges. The x-alignment of the HB2-PR openings defines the width of the flux guides 58 and 62 and must therefore be somewhat precise. However, the required degree of x-alignment precision is easily accommodated by the photolithographic process used to form the HB2-PR openings. Advantageously, the "y" alignment of the HB2-PR openings is non-critical. That is because the "y" alignment between the end edges of the hard bias plugs 64 and 66, and the MR sensor element 52, is defined by the junctions 78 and 80 created by the X mask as part of the aforementioned double self aligned contiguous junction. Only the side edges 82 and 84 between the hard bias plugs 64 and 66 and the flux guides 58 and 62 are defined by the HB2-PR openings, as stated above.

Figure 5J:
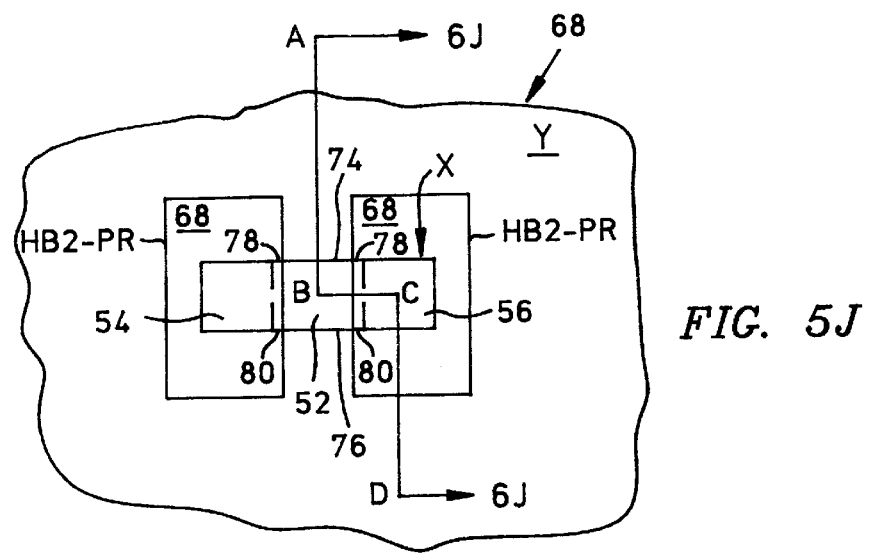
Figure 5K:
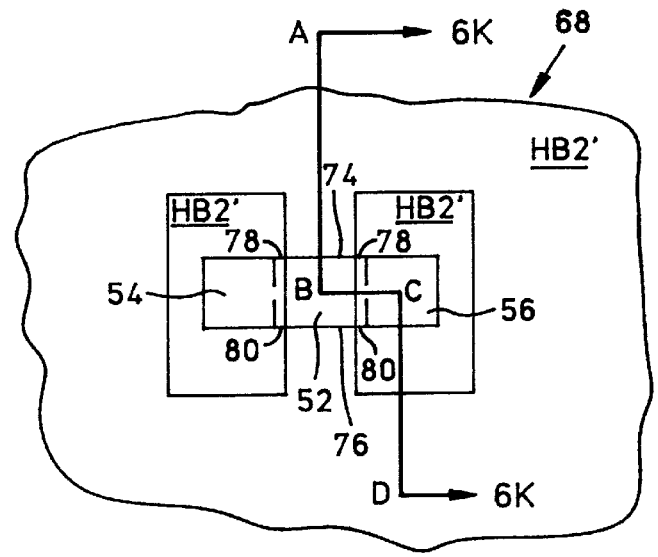

With the HB2-PR openings formed in the Y mask, the structure is ion milled, as shown in FIGS. 5J and 6J, to remove flux guide material FG at all locations within the HB2-PR openings where there is no X mask material. Where the material X mask itself is located, i.e., above the MR sensor element 52 and the hard bias plugs 54 and 56, only the top of the material X is removed such that the X mask remains in place defining the alignment of the existing junctions 74 and 76 and the incipient junctions 78 and 80. The MR sensor element 52 and the hard bias plugs 54 and 56 are not affected because they remain protected by the material X. A layer of insulation material INS2, which may be alumina (Al2O3) or the like, is then deposited over the whole wafer area, followed by a layer of the hard bias material HB2, as shown in FIGS. 5K and 6K, using either of the above-described R.F. sputtering or plasma etching/ion beam deposition processes of FIGS. 7A–7C or 8A–8D, used to form the HB1 and electrical lead layers, and the INS1 and FG layers. For clarity, the INS2 and HB2 layers are collectively designated as "HB2'" in the figures. The insulation material INS2 and the hard bias material HB2 fills the HB2-PR openings. Advantageously, the thickness of the INS2 and HB2 layers can be easily matched to the thickness of the INS1 and FG layers to improve biasing efficiency. The HB2 material may also be capped with an insulator for ease of subsequent connectivity of the electrical layer formed on the HB1 material to a pair of electrical leads (see FIG. 9).

Figure 5L:
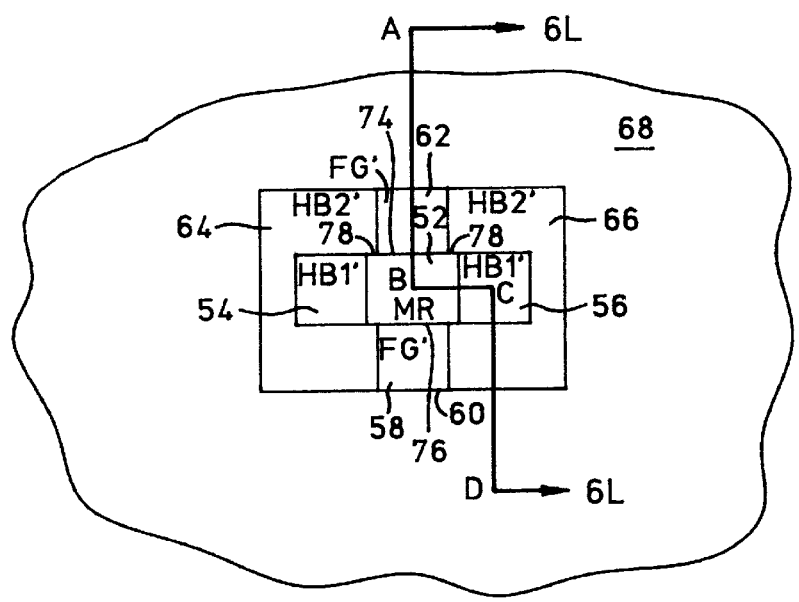
Figure 5M:
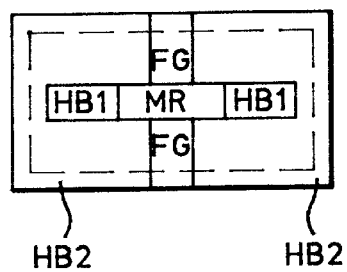
Figure 5N:
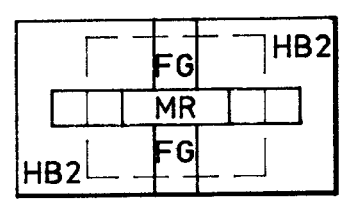

As shown in FIGS. 5L and 6L, a simultaneous (or sequential) liftoff of the Y and X masks exposes the desired structure. The unwanted flux guide material is then removed with a final trimming mask, FIG. 5M or 5N and 6M, to define both the end edges of the flux guides 58 and 62 and the outer edges of the HB1 and HB2 regions of material. As shown in FIGS. 5M and 5N, the trimming mask can either intersect only the HB2 material regions (FIG. 5M) or can intersect both the HB2 and HB1 material regions (FIG. 5N). The final trimming mask and an ion milling step around the whole structure renders the MR sensor shown in FIGS. 4A or 4B. As will be appreciated, the MR sensor of FIG. 4A results from the trimming mask of FIG. 4M, while the MR sensor of FIG. 5N results from the trimming mask of FIG. 5N. Electrical leads 82 and 84 can be added to the electrical lead layers formed on the HB1 plugs 54 and 56, as shown in FIG. 9. As shown in FIG. 10, the MR head 50 can be mounted in a flux-guided-MR head configuration between a pair of shields 86 and 88, which are separated from the sensor 50 by a pair of insulative gap layers 90 and 92, respectively. The shields 86 and 88 are preferably made from Permalloy (NiFe) and the insulative gap layers 90 and 92 are preferably alumina (Al2O3). Alternatively, as previously stated, the flux guides 58 and 62 could have been formed as shields in a yoke-MR head configuration. The bottom of the structure of FIG. 10 forms the ABS, of which the lower end edge 60 of the sensor 50 forms a part. The ABS flies over a magnetic medium 94. Alternatively, the shield 86 could also be a pole piece.

Figure 11A:
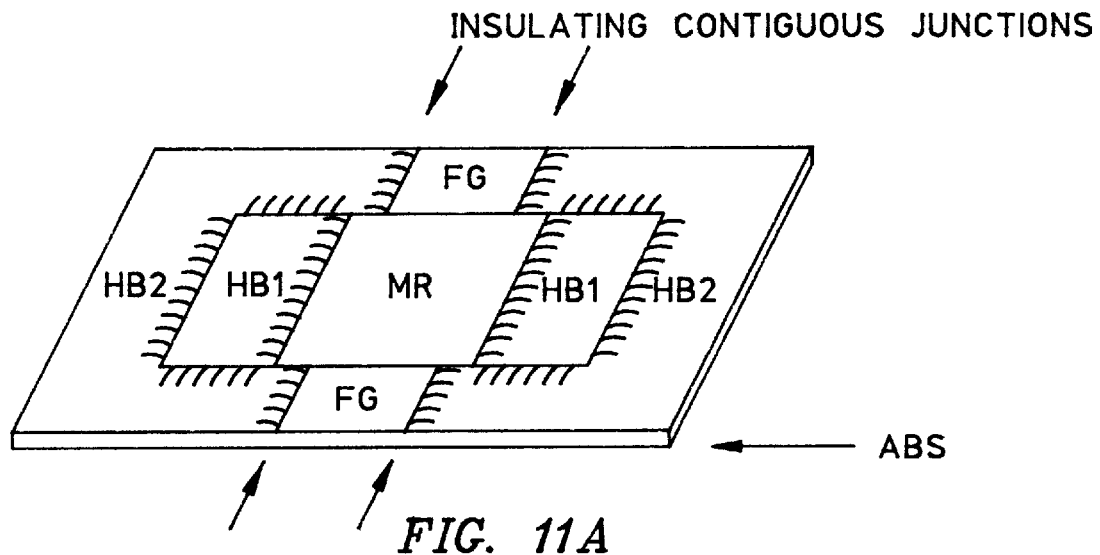
FIGS. 11A and 11B are perspective views from the ABS surfaces of recessed MR sensors made in accordance with the present invention.
Figure 11B:
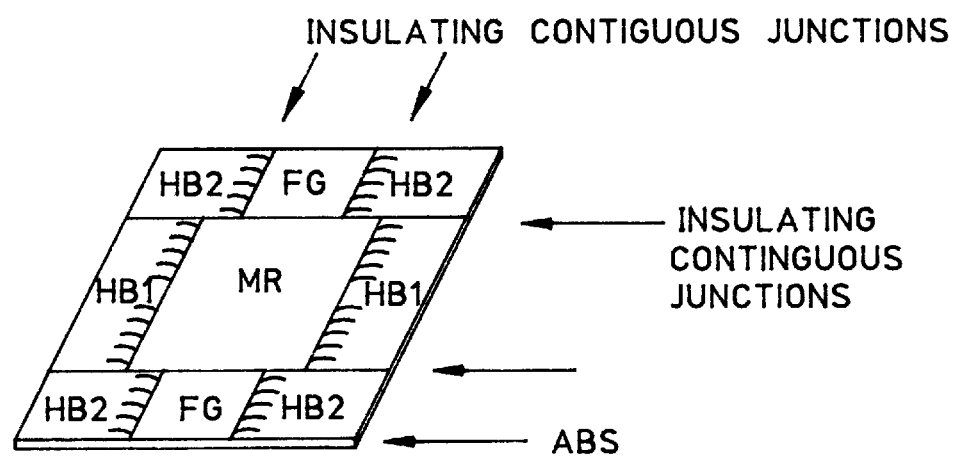

FIGS. 11A and 11B show perspective views of the recessed MR sensors 50 and 50' from their respective air bearing surfaces.

Accordingly, an MR sensor employing a double self aligned insulated contiguous junction for flux-guided MR or yoke MR head applications has been described, along with processes for making the same. The disclosed structure, when embedded between two shields (in flux-guided-MR head applications) or by the addition of a return pole piece above the sensor (in yoke-MR head applications), has the potential of being a magnetically stable head that can be extended to very high aerial densities. The teachings of the present invention may be employed to provide a non-recessed MR sensor having a double self aligned contiguous junction between the MR sensor element and a rear flux guide and its biasing regions (hard or exchange bias). Alternatively, the teachings of the present invention may be employed to provide an MR sensor that is recessed from an air bearing surface and which has two double self aligned contiguous junctions between the end edges of the MR sensor element and the front and rear flux guides and their biasing regions (hard or exchange bias). The recessed MR sensor element maintains electrical isolation in the presence of the flux guide insulation layer for improved signal efficiency. A recessed yoke or shielded sensor that is electrically insulated from the air bearing surface can be readily fabricated with high yields. In both recessed and non-recessed heads, the bias regions may be magnetically matched in thickness to the flux guide(s) to stabilize the flux guide(s) into a single domain state. Self aligned edges between the bias regions, the sensor and the flux guide material, provides optimum independent biasing of the sensor and the flux guide(s).

While various embodiments have been disclosed, it should be apparent that many variations and alternative embodiments would be apparent to those skilled in the art in view of the teachings herein. For example, an alternative embodiment that uses a non-insulated, self aligned contiguous junction at the FG step would allow the operation of a device in manner in which the current is run orthogonal to the air bearing surface. In that case, the FG flux guides would serve as part of the lead structure that injects current into the sensor while the insulated contiguous junctions of the HB2 plugs will provide proper current guiding into the relevant sensor area. In another alternative embodiment, the flux guides 58 and 62, which are made from Permalloy or the like (NiFe), could be substituted with heat guides, in which case there would be an INS1 insulation layer and a layer of highly heat conductive material such as copper. Further, a combined flux guide and heat guide could be substituted, in which case there would be a first INS1 insulation layer, a second layer of Permalloy (NiFe) and a third layer of copper. It is understood, therefore, that the invention is not to be in any way limited except in accordance with the spirit of the appended claims and their equivalents.

We claim:

1. A method of making a magnetoresistive (MR) head having a double self-aligned junction comprising:

forming an MR sensor on a substrate;

forming a pair of MR sensor bias structures on said substrate joining first and second side edge portions of said MR sensor to form a biased MR sensor structure having a central MR sensor sandwiched between a pair of bias structures;

forming a first resist mask over said biased MR sensor structure and milling to define first and second side edges representing the lateral bounds of said bias structures and first and second end edges representing the longitudinal bounds of said MR sensor and said bias structures;

using said first resist mask to form a guide on said substrate, said first resist mask being configured to form a first self-aligned contiguous junction between said guide and an end edge of said biased MR sensor structure;

forming a second resist mask over said first resist mask and said guide and milling to define a pair of openings extending beyond the side and end edges of said biased MR sensor structure and over at least a portion of said guide;

said milling being of a nature and quality to remove the material forming said guide as defined by said second resist mask while leaving said first resist mask sufficiently intact to continue to define said side and end edges of said biased MR sensor structure; and forming a pair of guide bias structures as defined by said second resist mask, said guide bias structures being configured to form a second self-aligned contiguous junction with an end edge of said MR sensor by virtue of said first resist mask, said first and second self-aligned contiguous junctions being in collinear alignment and providing a double self-aligned contiguous junction between an end edge of said MR sensor and said guide and guide bias structures.

2. The method of claim 1 wherein said first resist mask is formed with an undercut to form an overlapping said self-aligned contiguous junction.

3. The method of claim 1 further including the step of forming electrical leads on said MR sensor bias structures.

4. The method of claim 1 wherein said guide is formed with a guide material layer overlaying an insulation material layer.

5. The method of claim 1 wherein said guide is formed with a flux guide material layer.

6. The method of claim 1 wherein said guide bias structures are formed with a bias material layer and an insulation material layer.

7. The method of claim 1 wherein said guide bias structures are capped with an insulation material layer over a bias layer and wherein electrical connections are formed on said MR sensor bias structures.

8. The method of claim 1 wherein two guides are formed at end edges of said biased MR sensor structure.

9. The method of claim 8 wherein said second resist mask extends over at least a portion of each of said guides such that said guide bias structures envelop the side edges and a portion of the end edges of said biased MR sensor structure.

10. A method of fabricating a magnetoresistive (MR) head having a double self-aligned contiguous junction, comprising:

forming an MR sensor structure;

forming a guide using a first resist mask applied over said MR sensor structure;

forming a bias structure using said first resist mask and a second resist mask applied over said first resist mask and said guide; and said first resist mask being configured to form a double self-aligned contiguous junction between said MR sensor structure and both said guide and said bias structure.

11. The method of claim 10, wherein said first resist mask is formed with an undercut to form an overlapping said self-aligned contiguous junction.

12. The method of claim 10, further including the step of forming electrical leads on said MR sensor bias structures.

13. The method of claim 10, wherein said guide is formed with a guide material layer overlaying an insulation material layer.

14. The method of claim 10, wherein said guide is formed with a flux guide material layer.

15. The method of claim 10, wherein said guide bias structures are formed with a bias material layer and an insulation material layer.

16. The method of claim 10, wherein said guide bias structures are capped with an insulation material layer over a bias layer and wherein electrical connections are formed on said MR sensor bias structures.

17. The method of claim 10, wherein two guides are formed at end edges of said biased MR sensor structure.

18. The method of claim 17, wherein said second resist mask extends over at least a portion of each of said guides such that said guide bias structures envelop the side edges and a portion of the end edges of said biased MR sensor structure.

* * * * *